United States Patent
Khanna et al.

(10) Patent No.: US 6,243,389 B1
(45) Date of Patent: Jun. 5, 2001

(54) METHOD AND APPARATUS FOR INDEXED DATA BROADCAST

(75) Inventors: Sanjeev Khanna, Highland Park; Shiyu Zhou, North Planfield, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/082,788

(22) Filed: May 21, 1998

(51) Int. Cl.$^7$ .................................................. H04J 3/24
(52) U.S. Cl. .............................................. 370/432; 370/408
(58) Field of Search ..................................... 370/432, 431, 370/389, 390, 392, 401, 406, 408, 409, 468, 241, 248, 251, 252, 254, 256, 332, 318, 370, 371, 368, 351, 407, 411, 412, 229, 215, 240; 707/3, 10; 455/38.3

(56) References Cited

U.S. PATENT DOCUMENTS 5,202,986 * 4/1993 Nickel ..................................... 707/10
5,404,505 * 4/1995 Levinson .................................. 707/3

OTHER PUBLICATIONS

Imielinski et al., "Energy Efficient Indexing on Air," Proc. ACM SIGMOD Conf., May 1994.

\* cited by examiner

*Primary Examiner*—Dang Ton
(74) *Attorney, Agent, or Firm*—DeMont & Breyer, LLC; Wayne S. Breyer; Jason Paul DeMont

(57) ABSTRACT

In some embodiments, the present invention provides a method for scheduling an indexed data broadcast such that both mean access time and mean tuning time are reduced to a practical minimum. In one embodiment of such a method, data items are first scheduled for broadcast. Such data items are advantageously scheduled such that: (1) all data items to be broadcasted are equally spaced; and (2) when indexed with appropriate "indexing keys," the indexing information can be efficiently stored and broadcasted. In one embodiment, a schedule having a mean access time about 1.5× that of the theoretical minimum is provided. The indexing information is advantageously arranged in a way that allows for efficient delivery thereof to clients to apprise them of the broadcast schedule of the data items. The indexing information is advantageously arranged in a tree structure referred to herein as an "indexing tree." Indexing information is advantageously stored at internal nodes of the indexing tree and data items are stored at the leaf nodes of the tree. The leaf nodes comprising the scheduled data items fall within "subtrees" of the various internal nodes of the indexing tree. Information indicative of the index keys of data falling within a subtree of a given internal node is stored at that node. According to a schedule, indexing information of the internal node is broadcasted, so that a client who is "tuned in" to the broadcast is apprised of the data that will be broadcasted as a subtree of the node. If desired data is not included in the subtree, it is safe for the client to stop listening to the broadcast (i.e., "sleep") until such time as that portion of the broadcast is completed. By advantageously providing, in addition to the indexing information, the time at which the first internal node outside of the subtree will be broadcasted, the client can set an internal alarm and sleep until the set time.

13 Claims, 3 Drawing Sheets

METHOD AND APPARATUS FOR INDEXED DATA BROADCAST

FIELD OF THE INVENTION

The present invention relates generally to wireless data broadcast systems, and more particularly to efficient information retrieval in such systems.

BACKGROUND OF THE INVENTION

Cellular phones, no more than a curiosity less than a decade ago, are now commonplace. In addition to their wide spread use in developed counties, cellular phones are popular in developing countries as well, where wireless telecommunications systems for supporting such cellular service can be implemented much more quickly than a conventional wireline system.

The acceptance and growth of wireless systems for data communications, as opposed to voice communications, has been relatively slow. It is believed, however, that such wireless data communications systems are ready for significant growth. Factors portending such growth include the ever-decreasing size of computers and the increasing regularity with which such computers are fitted with receivers for receiving wireless signals. Such small size and wireless capabilities facilitates mobile access to data networks, such as the Internet. See, Hills, "Terrestial Wireless Networks," vol. 278, no. 4, *Scientific American*, pp. 86–88, (April 1998).

Designers of wireless data networks will face certain challenges in making information readily accessible to mobile clients. One problem relates to the efficient retrieval of desired information by the client Such a problem is inherent in an "asymmetric" communication environment, such as a data communications network. A communication environment is described as "asymmetric" if the available or required communication capacity from the information source ("server") to the information recipient ("clients") is much larger than that available or required in the reverse direction.

FIG. 1 depicts an example of such an asymmetric environment wherein numerous mobile clients, five of which are pictured as mobile clients 104a–104e, retrieve information from a server base station 102 that broadcasts such information over a wireless channel. Mobile clients 104a–104e may be, for example, lap-top computers that include a receiver for receiving wireless communications. In the present example, such computers are assumed to be running on batteries, as may be required, for example, if the computer is in the possession of a user travelling in an automobile.

There are two fundamental models by which clients can retrieve information from a server. One is the "pull-based" model, used in traditional client-server information-retrieval systems, wherein multiple clients retrieve information by making individual requests to the server. Such a model is poorly suited for the asymmetric environment under consideration. First, since each "terminal" (i.e., client) is assumed to be a weak transmitter, a variety of signal strength/interference problems may arise. Secondly, an enormous volume of requests would be received by the server, making the processing of such requests problematic.

A second model is the "push-based" model, wherein the server broadcasts its information over a communication medium to multiple clients who receive such information simultaneously (ignoring time delays). Each of such clients then actively retrieves information of interest from the universe of information received. While the "push-based" model is effective in disseminating massive amounts of information to numerous clients, such an approach has associated with it potentially significant shortcomings.

In particular, an individual client looking for certain items of information may have to actively listen to the communication medium for a long time to receive such information. The "cost" to a client of information retrieval may be viewed as comprising two distinct components: (1) the time elapsed in retrieving information of interest, and (2) the time elapsed in actively listening to the communications medium for the information of interest. The first component is referred to as the "access time" and the second component is referred to as the "tuning time." The distinction between access time and tuning time is based on an assumption that the clients are able to switch between a resource-consuming (e.g, battery power) "active mode" and a resource-conserving "sleep mode." Such modes are commonly used in computers.

Listening to the communications medium requires that a client be in the active mode. To decrease time spent in the active mode, a server may provide information indicative of when various items of information will be broadcast ("indexing information"). Thus, knowing that for at least a certain period of time no relevant information will be broadcast, the client is able to lapse into the resource-conserving sleep mode. Tuning time thus forms a measure of the efficient utilization of certain important resources, such as the limited power supply of mobile lap-top computers, in the process of information retrieval.

A substantial amount of work in the prior art has addressed the issue of minimizing access time in the classical pull-based model. There is a fundamental difference, however, between efficient information retrieval in pull-based models and in push-based models. In particular, in the pull-based model, an information search can always begin at a certain well-defined location, such as the "root" of a "balanced search tree," for example. In a push-based broadcast model, the client begins its information search based only on the information that is being broadcast at the moment it tunes in. This aspect of the push-based broadcast model makes the problem of minimizing access and tuning time particularly difficult The prior art has addressed the issue of information retrieval in push-based broadcast models, but mainly towards the end of minimizing access time, not tuning time, and typically in models in which the broadcast consists solely of data items, not indexing information. Information retrieval in an indexed data broadcast was first addressed by Imielinsli et al. in "Energy Efficient Indexing on Air," Proc. ACM SIGMOD Conf., May 1994. lmielinski et al. considered a simple case where the distribution over data items is uniform (i.e., each data item appears the same number of times as all other data items in the broadcast).

It would be desirable then, to have a broadcasting method that seeks to minimize a client's expected access time ("mean access time") and expected tuning time ("mean tuning time"), and for an information repository comprising arbitrarily distributed data items.

SUMMARY OF THE INVENTION

In some embodiments, the present invention provides a method for scheduling an indexed data broadcast such that both mean access time and mean tuning time are reduced to a practical minimum. In one embodiment of such a method, data items are first scheduled for broadcast. Such data items are advantageously scheduled to provide a "feasible" data schedule wherein: (1) all data items to be broadcasted are equally spaced; and (2) when indexed with appropriate "indexing keys," the indexing information can be efficiently stored and broadcasted in a way that requires relatively few bits and therefore does not substantially lengthen the mean access time of the broadcast.

A feasible data schedule is contrasted from an "optimal" data schedule, which has the theoretically lowest mean access time. Such an optimal data schedule is based on readily calculable optimal distances between repeat occurrences of data items. For reasons described later in this specification, it is typically not possible to design an "optimal" data schedule using such "optimal" spacing values. Thus, the "feasible" data schedule is instead developed In one embodiment, a feasible data schedule is provided by shifting the value of the optimal distance between repeat occurrences of data items to the closest power of 2 that is bigger than or equal to said optimal distance value. In those embodiments, the distance between shifted data items j is, at most, 2× the optimal distance. Such a schedule results in a mean access time that is about 2× that of the theoretical minimum access time. In an alternate embodiment of a feasible data schedule, a schedule having a mean access time about 1.5× that of the theoretical minimum is provided. To attain the lower mean access time of the alternate embodiment, the "shifting" methodology is modified from the simple "rounding-up" method described above.

After scheduling the data, index keys are advantageously assigned to the data items. Having set the data schedule, and assigned index keys to the data items, the indexing information is advantageously arranged in a way that allows for efficient delivery thereof to clients to apprise them of the broadcast schedule of the data items. In accordance with the present teachings, the indexing information is advantageously arranged in a data structure referred to herein as an "indexing tree." While a "tree" is a known data structure, the manner of its use herein, wherein the tree is structured in a way that advantageously reduces both mean access time and mean tuning time, has been hitherto unknown in the art.

In accordance with the present teachings, the indexing information is advantageously stored at internal nodes of the present indexing tree. Data is stored at the "leaves" of the tree. The scheduled data items fall within "subtrees" of the various internal nodes of the indexing tree. Information indicative of the index keys of data falling within a subtree of a given internal node is stored at that node. According to a schedule, indexing information of the internal node is broadcasted, so that a client who is "tuned in" to the broadcast is apprised of the data that will be broadcasted as a subtree of the node. If desired data is not included in the subtree, it is safe for the client to stop listening to the broadcast (i.e., "sleep") until such time as that portion of the broadcast is completed. By advantageously providing, in addition to the indexing information, the time at which the first internal node outside of the subtree will be broadcasted, the client can set an internal alarm and sleep until the set time.

It will be appreciated that if the index keys for each of the data items in the subtree of an internal node were stored at such a node for broadcasting, the broadcast would be substantially lengthened. In accordance with the present invention, by virtue of the manner in which the data is scheduled and indexed, the indexing information is advantageously stored in the form of "ranges." Thus, only the first and last index key of the range need be stored and broadcasted, which significantly reduces storage bits and hence, broadcasting time, relative to explicitly storing each index key corresponding to each data item in the subtree of a node.

Having thus scheduled the data items for broadcast, assigned index keys, and developed the indexing mechanism (i.e., the indexing tree), a broadcast of both the data items and the index keys is scheduled. In one embodiment, the broadcast is scheduled as an ordered "depth-first" traversal of the indexing tree. By virtue of the manner in which indexing information is arranged in the indexing tree (at internal nodes), and the manner in which such indexing information is interspersed with the data items (which appear as "leaves" of the tree) for broadcasting, mean access time and mean tuning time are substantially reduced compared to prior art methods.

The data items and indexing information are broadcast according to the broadcast schedule described above, proceeding as an ordered traversal through the indexing tree. As the traversal "visits" an internal node of the indexing tree for the first time, the indexing information stored at such a node is broadcasted. After visiting an internal node, the cycle then continues by traversing subtrees of the "children" of such a node. As the traversal visits a "leaf node," a data item j is broadcasted.

Regarding retrieveal of indexing and data information by the client, various scenarios arise depending upon when in the broadcast cycle the client tunes in. Deferring specifics until later in this specification, the client may stay tuned (1) until it receives the desired information or (2) until it determines that the desired information will not be broadcasted for a specified period of time, at which time it "goes to sleep" and then "wakes up" at the end of the specified period of time. The decision to stay active, or, alternatively, to sleep for a period, is based on the broadcasted index information.

DETAILED DESCRIPTION OF THE INVENTION

Figure 1:
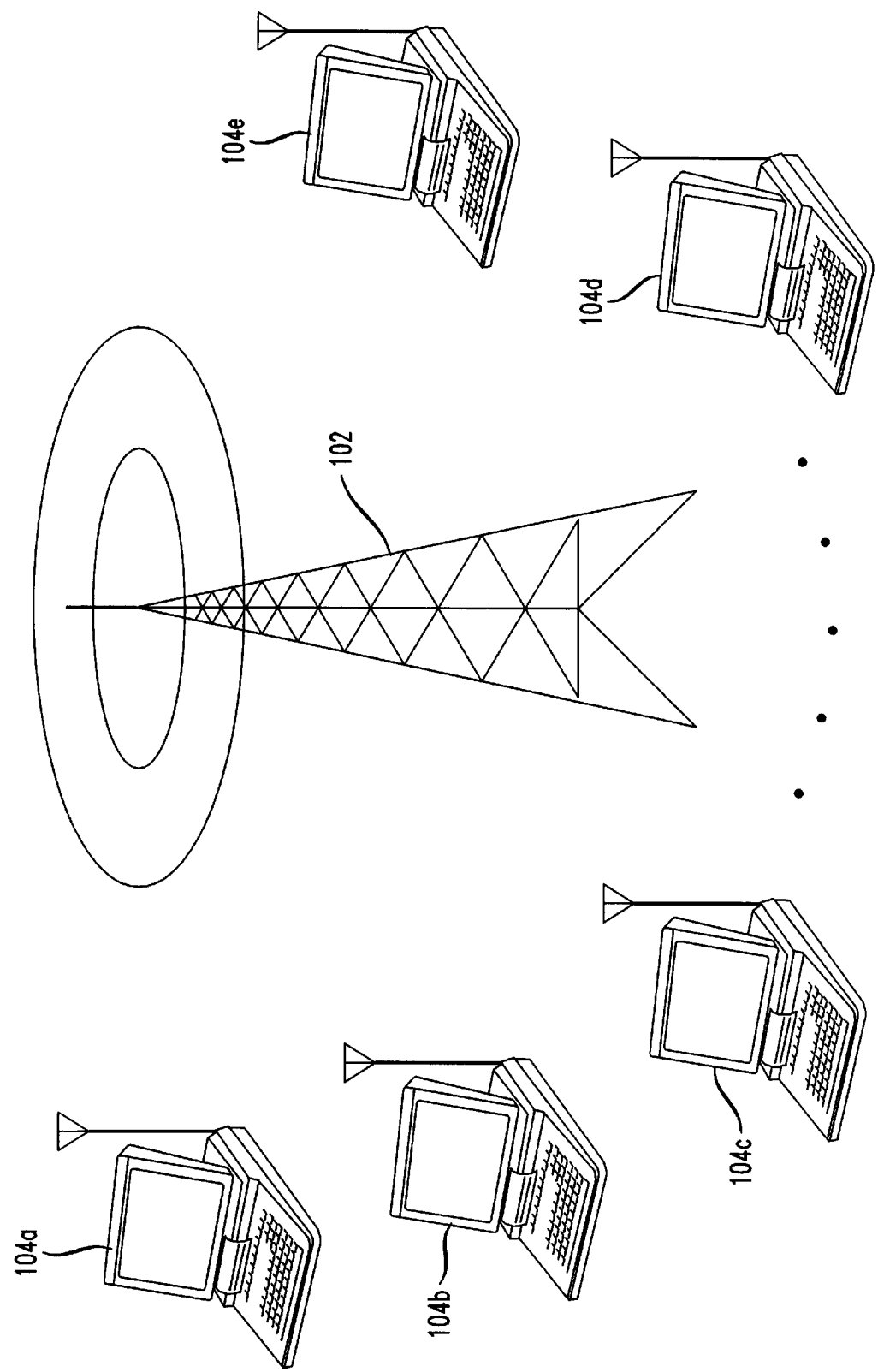
FIG. 1 depicts an asymmetric communications environment.

The illustrative embodiments of the indexed data broadcast method depicted and described herein are useful in conjunction with both wireless and wireline data communications systems. For both such applications, a server (e.g., a base station) broadcasts information over a communications channel supported by a communications medium (e.g, air, wire, optical waveguides, etc.) to a multiplicity of clients (e.g, a wireless terminal, such as, for example, a lap-top computer operable to receive broadcasted information, or a wireline terminal).

For clarity of explanation, a method in accordance with an illustrative embodiment of the present invention is presented as a collection of individual functional blocks. The functions these blocks represent may be provided, in both the server and the client, using either shared or dedicated hardware, including, without limitation, a transmitter (in the server), a receiver (in the client) and hardware capable of execting software. Illustrative embodiments of such software-executing hardware comprise an appropriately-programmed general purpose processor or hardwired special-purpose processor, read-only memory (ROM) for storing software performing the operations described herein and random-access memory (RAM) for storing processor results.

For clarity, it is beneficial to now define certain terms and assumptions pertaining to the present method. In the present method, a server broadcasts information or data ("data items") over a single fixed channel and one or more clients tune to the channel and extract data items of interest ("desired data"). Data items, j, for broadcast, are each uniquely identified by a "primary key" or "index," denoted "key (j)." Index key (j) is a distinct number between 1 and n, assigned by the server, wherein n is the total number of unique data items for broadcast. Primary key assignment is performed by the server dunng a data item broadcast scheduling operation. Such assignment is provided or otherwise known to the client A broadcast comprises repetitions of a "broadcast cycle." The broadcast cycle comprises a sequence of item "buckets" each having a uniform size of L bits. Such buckets include data buckets, which contain data items, and index buckets, which contain indexing information such as a list of primary keys for a set of data items. The capacity of each bucket is assumed to be sufficient to contain an amount, log n, of primary keys or indices. Since the primary key of any data item requires log n bits, $L=\log^2 n$. Each data bucket is assumed to contain one complete data item. The period of time required to broadcast or receive a bucket is assumed to be one unit of time.

A probability distribution $p^*=[p_1, p_2, \ldots p_n]$ is associated with data items j in the broadcast. The probability $p_j$ associated with a data item j represents the "likelihood" of that item being requested (i.e., the item's "popularity") by clients at any point of time. More popular items are repeated in a broadcast cycle more often than less popular items. The probability distribution is assumed to be known to the server as statistical data that is gathered or otherwise provided to the server for use in developing a broadcast schedule.

The "access time" of a request is defined to be the time elapsed from the moment the client makes the request (e.g., such as by a user keying the request into a lap-top computer), to the time when the requested item is broadcasted. The "mean access time" of a broadcast is the expected access time of a request, randomly chosen according to the distribution p, over all possible moments of making the request. That is, given a total number, N, of buckets in a broadcast cycle, and an access time, W(t,j), of a request for item j that is made at a time, t, in a broadcast, then mean access time of the broadcast is given by:

$$(1/N)\sum_{t=1}^{N}\sum_{j=1}^{n}p_j W(t, j). \quad [1]$$

The "tuning time" of a request is the amount of time spent by the client "listening" to the broadcast channel from the moment when the request is made to the time when the requested item is broadcasted, wherein "listening" means that the client is in a resource-consuming "active mode." The "mean tuning time" is defined analogously to mean access time, and is given by:

$$(1/N)\sum_{t=1}^{N}\sum_{j=1}^{n}p_j T(t, j). \quad [2]$$

wherein: T(t,j) is the tuning time for item j made at time t in the broadcast cycle.

Figure 2:
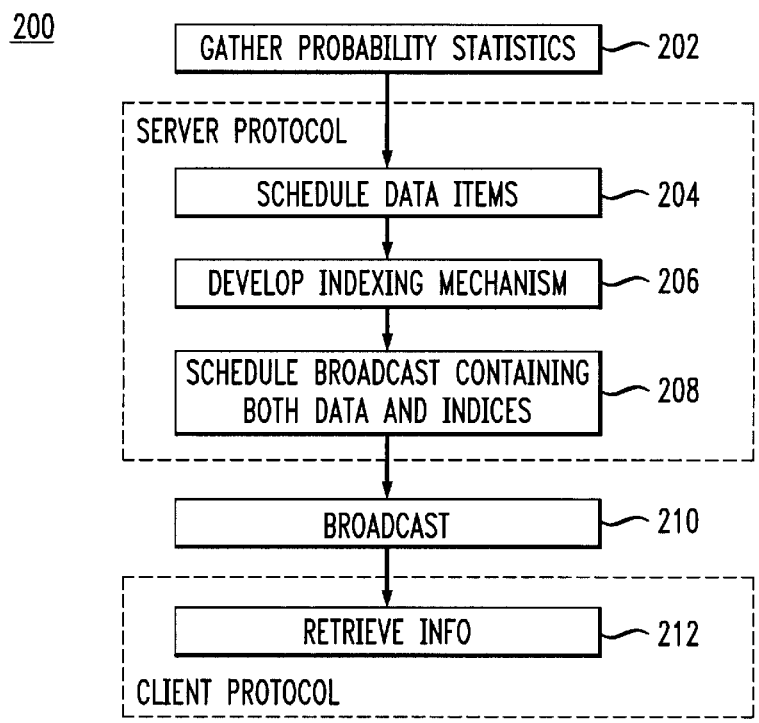
FIG. 2 depicts a flow diagram of a method for indexed data broadcast in accordance with an illustrated embodiment of the present invention.

A method 200 for indexed data broadcasting in accordance with an illustrative embodiment of the present invention is now described with reference to FIG. 2. The various operations comprising method 200 are first discussed briefly to provide an overview and perspective. Such operations are then described in detail.

In operation 202, probability statistics are gathered, according to well-known methods, regarding the "popularity" of each data item j to be broadcasted. From such statistics, the aforementioned probability distribution p* is developed via known methods. Popularity $p_i$ of each data item j is fixed for a given broadcast cycle, but may change in successive cycles.

In operation 204, all data items j to be broadcast are scheduled. The scheduling of data items proceeds in a manner that attempts to reduce (relative to prior art methods) or minimize, to the extent possible, mean access time. To efficiently apprise the clients of the broadcast schedule of data items j, an indexing "mechanism" is advantageously developed, as per operation block 206. The indexing mechanism incorporates a "primary key" or "index" key (j) for each data item j, in addition to other information. The indexing mechanism comprises a "q-ary indexing tree." While a "tree" is a known data structure, the manner of its use herein, wherein the tree is advantageously structured in a way that reduces both mean access time and mean tuning time, has been hitherto unknown in the art.

In operation 208, a broadcast of both the data items j and the indices key (j) is scheduled. The scheduling is advantageously performed such that both mean access time and mean tuning time is kept relatively low. In one embodiment, the broadcast is scheduled as an ordered "depth-first" traversal of the indexing tree. By virtue of the manner in which indexing information is arranged in the indexing tree (at internal nodes), and the manner in which such indexing information is interspersed with the data items (corresponding to leaf nodes of the tree) for broadcasting, mean access time and mean tuning time are substantially reduced compared to prior art methods.

The data items and indexing information are broadcast, in operation 210, in accordance with the schedule developed in operations 204–208. The broadcast cycle proceeds, as described above, as an ordered traversal through the indexing tree. As the traversal "visits" an internal node of the indexing tree for the first time, the indexing information stored at such a node is broadcast. After visiting a node, the cycle then continues by traversing subtrees of the "children" of such a node. As the traversal visits a leaf node, a data item j is broadcasted.

The present method may viewed, in one sense, as a protocol between a server and its clients. That protocol may in turn be viewed as two sub-protocols: a broadcasting protocol followed by the server and a receiving protocol followed by the clients. The broadcasting protocol comprises operations 204, 206 and 208 of method 200. The receiving protocol comprises operation 212, described below.

In operation 212, the client tunes into the broadcast. Various scenarios arise depending upon when in the broadcast cycle the client tunes in. Deferring specifics until later in this specification, the client may stay tuned (1) until it receives the desired information or (2) until it determines that the desired information will not be broadcasted for a specified period of time, at which time it "goes to sleep" and then "wakes up" at the end of the specified period of time. The decision to stay active, or, alternatively, to sleep for a period, is based on the broadcasted index information.

Having provided an overview of the various operations comprising method 200, such operations are now described in detail. For clarity of explanation, further description of operation 204 is deferred until after operation 206 is described.

Figure 3:
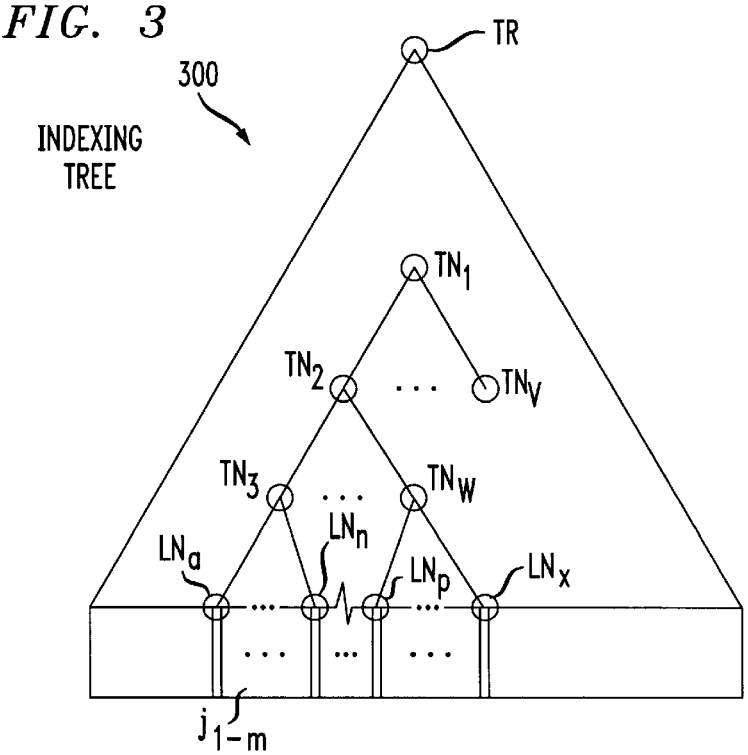
FIG. 3 depicts an indexing tree for use in conjunction with the method of FIG. 2.

FIG. 3 depicts q-ary indexing tree 300 in accordance with the present teachings. Indexing information is advantageously presented and organized within the indexing tree 300 in a way that can reduce mean tuning time to a practical minimum. In the term "q-ary," "q" is a parameter that refers to the number of "children" of each internal node. Further description of parameter q, and its quantification, is provided later in this specification.

Indexing tree 300 includes root TR, leaf nodes $LN_d$, where d=1, ..., m, where m is the total number of data items in the broadcast cycle, and internal nodes $TN_k$, five of which nodes, $TN_1$, $TN_2$, $TN_3$, $TN_v$, and $TN_w$, are depicted in FIG. 3. Leaf nodes $LN_d$ are associated, in a one-to-one correspondence, with the data buckets containing data items j, m in number. Note that the number m of leaf nodes includes repeats of any of the unique data items j that occur in the broadcast cycle, so that, typically, m>n. Internal nodes $TN_k$ comprise index buckets that contain specific indexing information. In one embodiment, such specific indexing information advantageously includes: (1) information indicative of the primary keys or indices, key (j), for each data item j in the leaves of the "subtree" rooted at the particular internal node $TN_k$; and (2) a pointer to the next internal node that will be visited for broadcast, in accordance with the scheduling, that is not contained in the subtree of $TN_k$. The pointer is advantageously represented as a time offset indicating how long from the present time the next internal node will be broadcasted.

The term "subtree" refers to a set of nodes connected or indirectly connected to a given node and having a higher order than the given node (root TR having the lowest order), and to the leaves associated with the highest-ordered nodes in the subtree. For example, in FIG. 3, internal nodes $TN_3$ and $TN_w$ and the leaf nodes $LN_a$–$LN_n$, and leaf nodes $LN_p$–$LN_x$ comprise a subtree of node $TN_2$. Leaf nodes $LN_a$–$LN_n$ comprise a subtree of node $TN_3$ and leaf nodes $LN_p$–$LN_x$ comprise a subtree of node $TN_w$. Note that the ellipses marks in FIG. 3 indicate that there are actually more children than are shown (i.e., q is greater than 2). Thus, leaf node $LN_n$, which is the qth child of internal node $TN_3$ is not adjacent to leaf node $LN_p$, which is the first child of internal node $TN_w$.

Data items j are associated with particular internal nodes as follows. The q-Mary tree is "superimposed" on the sequence of data items (which sequence is first developed) such that the "leaves" (i.e., leaf nodes) of the tree correspond to the data items. The parameter q is determined based on the amount of "distortion" allowed in the mean access time and mean tuning time. A larger value for parameter q results in smaller mean access time but a larger mean tuning time. The tradeoff between access time and tuning time is described quantitatively later in this specification.

The indexing tree is constructed as follows. "Children," q in number, are branched out from the root node (i.e., node TR in FIG. 3). In other words, there are q nodes depending directly from the root node. Proceeding left to right, children, again q in number, are branched out from each of the q children of the root node. The process is continued until there are m leaf nodes, where, as previously defined, m is the number of appearances of data items in a broadcast cycle. Leaf nodes are then aligned with data items in a one-to-one correspondence. Having so aligned the leaf nodes and data items, each internal node is thus associated with the set of data items appearing in its subtree. As previously noted, indexing information indicative of the data items appearing in the subtree of an internal node is stored at that internal node.

In accordance with the present teachings, the indexing information is provided in a way at each internal node $TN_k$ that advantageously reduces a client's tuning time and access time. In particular, assume that a client makes a request for an item of information, which, presently unknown to the client, is contained in leaf node $LN_t$ (not shown), which is a child of internal node $TN_w$. The client then tunes into the broadcast. For the purpose of the present example, the server is assumed to be broadcasting internal node $TN_3$ when the client tunes in In possession of the index key key (j) of the desired information, the client compares index key (j) with the indexing information being broadcasted to determine whether or not the requested data item is in the subtree rooted at the $TN_3$. Since, in the present example, the subtree of $TN_3$ does not contain data item of interest, the client's search will reveal that the index key of interest is not in the subtree. After reading the "pointer" that provides the time offset to the next internal node outside of the subtree of $TN_3$, the client sets an alarm and advantageously shifts into "sleep mode." When the set time is reached, the client "wakes up" and searches the indexing information of internal node $TN_w$, which, for the purpose of the present example, is the next internal node outside the $TN_3$ subtree. Since the search will reveal that the desired information is in the subtree of $TN_w$, the client stays active waiting for the desired information to be broadcasted (as described later, leaves nodes $LN_p$–$LN_x$ are broadcast after $TN_w$).

It will be appreciated that many of the internal nodes may have a very large number of leaf nodes (i.e., a very large number of data items) in their associated subtrees. As such, explicitly storing each primary key key (j) of each data item j in a subtree would require a large number of index buckets. Unfortunately, as the number of index buckets increases, so does the mean access time. In accordance with the present teachings, information concerning primary key key (j) for each data item in the subtree of an internal node is stored in a way that advantageously uses substantially fewer index buckets than would otherwise be required if each primary key was explicitly stored in index buckets at an internal node. By virtue of such a storage method, each internal tree node remains "small." It can be shown that if the internal nodes remain "small," and with an appropriate choice of parameter q, mean access time of the present broadcasting method is substantially the same as the mean access time for a broadcast consisting only of data items without indexing information. Quantification of the adjective "small," as it pertains to an internal node, is provided later in this specification.

In one embodiment, a storage method for keeping tree node size small advantageously comprises partitioning the primary keys key (j) for the data items j appearing in a subtree into intervals or ranges. Advantageously, only the two end-points of each interval are stored. Advantageously, the primary keys are arranged into a "minimal interval partitioning" wherein no two intervals in the partitioning of the primary keys can be combined to form a larger interval. In other words, a minimum number of intervals are used to cover all primary keys. As a trivial example, assume that the primary keys in a subtree included: 1, 2, 3, 4, 6, 7, 8, 9, 10, 11 and 13. The minimal interval partition for such a set of primary keys is 1–4, 6–11 and 13. The "interval partition number," for such a partitioning is three, since there are three intervals. Note that even in this trivial example, the amount of numbers being stored is reduced by more than a factor of two using minimal interval partitioning.

It will be appreciated that minimal interval partitioning is effective in reducing storage space (i.e., broadcast cycle length) only if, when partitioned, the total number of intervals of a set of primary keys associated with each subtree is "small." In accordance with the present invention, a "small" number of intervals results when data items are scheduled in accordance with operation 204, now described in detail.

In operation 204, data items j are advantageously scheduled to satisfy two constraints or requirements. First, the scheduling results in a relatively small mean access time. Second, as previously noted, the scheduling results in a relatively small interval partition number for any subtree. It is known in the art that to achieve minimum access time, a broadcast must be scheduled such that appearances of each data item j are equally spaced. A optimum data schedule, which achieves such minimum access time, can be characterize by the following expression:

$$d_j^* = \sum_{i=1}^{n} (p_i)^{1/2}/(p_j)^{1/2} \quad [4]$$

wherein: $d_j^*$ is the optimal distance between two consecutive appearances of item j in a broadcast cycle.

Unfortunately, the "optimal" data schedule is, most likely, not possible to implement. In particular, the optimal distance $d_j^*$ between repeat occurences of a data item j may not be an integer. Since distance $d_j^*$ is measured in "data items" (i.e., sports news should occur every d items), and it is not possible to have a fractional data item (e.g, sports news should occur every 116.4 data items), an optimal schedule including such a fractional spacing is not feasible. Moreover, it is known that minimizing mean access time is "NP-hard," which means that there is no readily-determined efficient solution to such a problem. Therefore, rather than detaining an "optimal" data schedule, a "feasible" data schedule is advantageously developed. The "feasible" data schedule advantageously has the following characteristics or properties: (1) data items j are equally spaced; (2) primary keys are assigned such that the scheduled sequence results in a relatively small minimum interval partition number for each subtree.

In one embodiment in accordance with the present teachings, properties (1) and (2) can be attained by shifting the value of any optimal distance to the closest power of 2 that is bigger than or equal to said value of the optimal distance. In those embodiments, the distance between shifted data items j is, at most, 2× the optimal distance. Such embodiments provide a "2-approximation" (i.e., twice the optimal) in mean access time.

The requirements of a feasible sequence can thus be quantified as follows. A distance, $d_j$, is defined as the distance between two consecutive appearances of data item j in the broadcast, wherein j=1 to n. A sequence of distances $d_1, d_2, \ldots d_n$, is "feasible"if: (1) each $d_j$ is an integer power of 2; and (2) $\Sigma_{j=1}^{n}(1/d_j) \leq 1$, which is simply a quantitative way of expressing the two properties indicated above. Given an array of empty data buckets, $N_o$ in number, where $N_o = d_n$ (in other words $N_o$ is equal to the total number of appearances of all data items j in the broadcast schedule), scheduling proceeds as follows. Assuming the first available data bucket in the array is at position t, data item j is assigned to the set of buckets at positions $t + ld_j$, wherein: $l = 0, 1, \ldots, \lfloor(N_o - t)/d_j\rfloor$. Appearances of the next specific data item are similarly scheduled starting with the first available data bucket after position t.

Using the "shifting" methodology described above, mean access time will be, at worst, 2× the optimal value. In other embodiments, a lower access time may be required, or at least desirable. In one of such other embodiments, a 1.5 approximation in mean access time is achievable by appropriately shifting the optimal data schedule. Such a modified sequence satisfies requirements (1) and (2) above, as well as satisfying the property that mean access time is at most 3/2 times the optimal. Such a shifting method is described below in conjunction with FIGS. 4 and 5.

Figure 4:
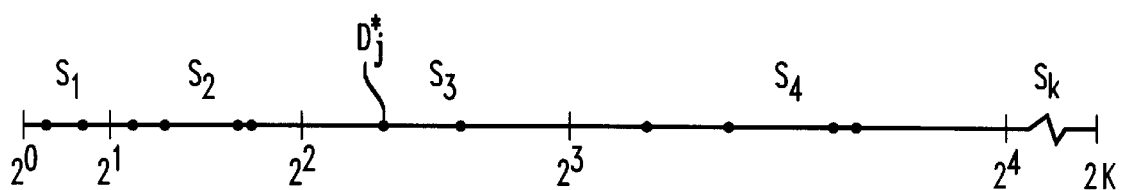
FIG. 4 depicts the manner in which optimal distances $d^*_j$ for each of the data items are partitioned into intervals defined by consecutive integer powers of 2.

As depicted in FIG. 4, the optimal distances $d_j^*$ for each of the data items, only a few of which are shown (as "dots" along a line), are partitioned into K intervals $S_1, \ldots, S_K$. Each interval is defined or bounded by consecutive integer powers of 2. In other words, the first interval $S_1$ is bounded by $2^0$ and $2^1$, second interval $S_2$ is bounded by $2^1$ and $2^2$, etc.

Figure 5:
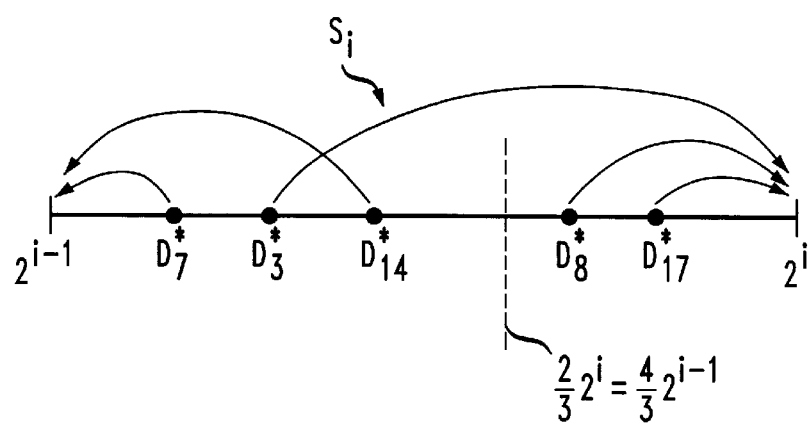
FIG. 5 depicts an illustrative embodiment of a method for shifting the optimal distance between data items to achieve a 1.5× appromimation to minimum mean access time.

A shifting method in accordance with the present teachings for achieving a 1.5× approximation to optimal mean access time is depicted in FIG. 5. Interval $S_i$, bounded by $2^{i-1}$ and $2^i$, is illustrated in FIG. 5. Illustrative optimal distances $d_3^*, d_7^*, d_8^*, d_{14}^*$ and $d_{17}^*$ for each of items 3, 7, 8, 14 and 17, respectively, are shown to be in the interval $S_i$. Their proximity—that is, the similarity in optimal distance for each of such items—results from the fact that such items have similar probabilities of occurrence. For each interval, if optimal distance $d_j^*$ of an item is greater than $(2/3)2^i = (4/3)2^{i-1}$, then that optimal distance is shifted upwardly to the next power of 2 (i.e., $2^i$). Thus, in the illustrative example, $d_8^*$ and $d_{17}^*$ are shifted upwardly to $2^i$. Items having optimal distances $d_j^*$ that are less than or equal to $(4/3)2^{i-1}$, are shifted up and down, alternatively, to the nearest powers of 2. In the illustrative example, $d_7^*$ and $d_{14}^*$ are shifted downwardly to $2^{i-1}$, and $d_3^*$, is shifted upwardly to $2^i$.

Figure 6:
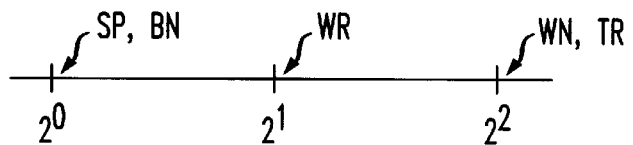
FIG. 6 depicts illustrative values of distances of several data items after shifting according to the method of FIG. 5.

After scheduling data items j, keys or indices are assigned to the data items as part of operation 204. Key or index assignment occurs in orderly fashion as a function of data scheduling. Consecutive numbers are assigned as the indices or keys. An illustrative key assignment is described with reference with FIG. 6, which depicts the result of the aforedescribed shifting procedure to several illustrative data items. In particular, data items comprising the sports news SP and business news BN have been assigned a distance of $2^0 = 1$, weather report WR has been assigned a distance of 2, and world news WN and the traffic report TR have been assigned a distance of 4. An illustrative key assignment for this example is SP=1; BN=2, WR=3, WN=4 and TR=5.

Having schedule data items and assigned indices, the q-ary indexing tree is constructed in accordance with operation 206, the details of which have already been described.

Further description of the parameter q and node size is now provided. As previously defined, each primary key or index can be specified using log n bits and each bucket in a broadcast has a uniform size L. It has been determined that each internal node of the indexing tree can be stored in r=O $((K \log n)/L)$ buckets. It is assumed that $K \leq 6 \log n$ and $L = \log^2 n$, so that:

$$r = O(1), \quad [5]$$

wherein: K is the number of intervals into which the data items have been grouped;

n is the number of unique data items; and

O is "big O," or "on the order of," which is a conventional notation defined for use herein as follows: a function $f(x)$ is said to be "$O(g(x))$" is there exists a constant, c, such that for every x, $f(x) \leq c \cdot g(x)$.

It can be shown that, in embodiments wherein the values of distances between successive occurrences of data items j are shifted to achieve a 1.5 approximation, the mean access time ACC of the broadcast cycle is at most:

$$(1 + [2r/q]) ACC_o + hr/2 \quad [6]$$

wherein: h is the height of the q-ary indexing tree and is given by:

$$h = \log_q N_o \quad [7]$$

wherein: $N_o$ is the total number of appearances of all data items in the broadcast cycle; and $ACC_o$ is the mean access time of the scheduled data (not including indexing information), and is given by:

$$ACC_o \leq (1.5 + o(1)) ACC^* + O(\log n) \quad [8]$$

wherein: o is "little o," which is a conventional notation defined for use herein as follows: a function $f(x)$ is said to be "$o(g(x))$" if the limit, as x approaches infinity, of $f(x)/g(x)$ is equal to zero; and ACC* is the mean access time at optimal spacing $d_j^*$, and is given by:

$$ACC^* = 1/2 \sum_{j=1}^{n} p_j(d_j^* + 1) \doteq 1/2 + 1/2 \left[ \sum_{i=1}^{n} (p_i)^{1/2} \right]^2 \quad [9]$$

The mean tuning time of the broadcast is at most:

$$MTT = 4qr \log_q \left[ \sum_{j=1}^{n} (p_j)^{1/2} \right] + (h + 2q)r. \quad [10]$$

From expressions [5] and [7], and the fact that $$\sum_{j=1}^{n} (p_j)^{1/2} \leq n^{1/2},$$

then $N_o \leq n^6$.

Choosing parameter q to be $3r/\epsilon$ and thus $h = \log_q N_o = O(\log n)$, then mean access time is given by:

$$ACC = (1.5 + \epsilon) ACC^* + O(\log n), \quad [11]$$

wherein $\epsilon$ is a suitably small constant that reflects an acceptable deviation in mean access time. An $\epsilon$ of 0.1 is expected to be suitable. Mean tuning time is given by:

$$MTT = O(\log n/(\epsilon \log \epsilon^{-1})). \quad [12]$$

Thus, by choosing parameter q as described above, mean access time is 1.5× the optimal, plus an additive term $O(\log n)$, and mean tuning time MTT is upper bounded by $O(\log n/(\epsilon \log \epsilon^{-1}))$.

Operation 208, scheduling the broadcast that contains both data and indices, and operation 210, broadcasting, are now described. The phrases "data burst" and "index burst" are used hereinafter to refer, respectively, to the broadcasting of a leaf node of the tree and an internal node of the tree. While a data burst broadcasts only one data bucket, an index burst will often broadcast several index buckets. All index buckets in a single index burst are broadcasted in order. In one embodiment a terminal index bucket in an index burst contains the above-described pointer to the next internal node not in the subtree of the previous node, while the other index buckets contains information pertaining to the primary keys key (k) of the subtree. Moreover, in some embodiments, each bucket in a broadcast contains a "flag" indicating whether it is a data bucket or an index bucket Additionally, each index bucket advantageously contains a flag indicating whether or not it is the first bucket of an index burst. Such flags facilitate the receiving protocol, as is described later in this specification.

As previously described, the broadcast schedule, which combines the data items and the indexing information, is generated in operation 208 by a "pre-order" traversal of the indexing tree. Whenever the traversal visits an internal node for the first time, it broadcasts the node (as a burst), and then traverses the subtrees of that node's children from left to right recursively. Referring to FIG. 3, the broadcast starts at root TR, and proceeds as described above. Picking up the broadcast cycle at node $TN_1$, that node is broadcast, and then node $TN_2$ is visited and broadcast. Next, node $TN_3$ is visited and broadcast. After broadcasting node $TN_3$, leaf node $LN_a$ is broadcast. The cycle then revisits node $TN_3$. Since node $TN_3$ has already been visited once and broadcast, it is not broadcast again during the present cycle. The cycle then visits and broadcasts the next leaf node, and continues cycling between internal node $TN_3$ and leaf nodes until leaf node $LN_n$ is visited and broadcasted. Then, the cycle revisits nodes $TN_3$ and $TN_2$. Since such nodes have already been visited once and broadcast, that are not broadcast again during the present cycle. The traversal then continues with the next child (not shown) of internal node $TN_2$, and then its children, q in number (which children are leaf nodes). The cycle continues in this manner until all internal nodes and all leaf nodes have been visited and broadcasted. The cycle then repeats finitely, unless changed.

Information retrieval, operation 212 of method 200, proceeds as a function of the type of information being broadcasted when a client "tunes in" In a first scenario, the client tunes in in the midst of a sequence of data burst In such a scenario, the client compares the key of the data item of interest, "101" for example, against the keys of the data items being broadcasted. If the client finds a match, it downloads the data bucket and tunes off. If no match is found, the client stays tuned in for the next burst.

In a second scenario, the client tunes in at the first bucket of an index burst. The client checks if key "101" belongs to one of the key ranges specified in the index burst, and proceeds as follows:

(A) If key "101" belongs to one of the key ranges, the client stays tuned in for the next burst. If the next burst is a data burst, the client proceeds as in the first scenario. If the next burst is an index burst, the client repeats the steps of the second scenario.

(B) If key "101" does not belong to any range specified in the current index burst, the client records the pointer (i.e., the time offset, t) for the broadcast of the next index burst and goes to sleep until then. The time t indicates the earliest time (from the current time) that the server will broadcast the indexing information concerning keys that do not belong to the subtree rooted at the current broadcast node. The client repeats the steps of the second scenario upon waking.

In a third scenario, the client times in as an index burst is in progress. The client will wait until the beginning of the next burst. If the next burst is a data burst, then the client proceeds as in the first scenario. If the next burst is an index burst, the client proceeds as in the second scenario.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. It is therefore intended that such other arrangements be included within the scope of the following claims and their equivalents.

We claim:

1. A method for indexing information for broadcast, comprising the steps of:

scheduling data items according to probability statistics concerning the popularity of such data items;

assigning indices to each scheduled data item, said indices functioning as an identifier of said each scheduled data item;

indexing the indices in a data structure having internal nodes and leaf nodes, wherein a data item is stored at each leaf node, and further wherein each internal node contains indexing information indicative of the indices of the data items stored in the leaf nodes in a subtree rooted at each internal node; and scheduling a broadcast cycle by which the data items and the indexing information are broadcast, wherein the broadcast cycle is a depth-first traversal of the data structure, wherein, the broadcast cycle starts from a root of the data structure, traversing subtrees of each child of the root recursively.

2. The method of claim 1, wherein the step of scheduling data items further comprises scheduling data items to provide a feasible schedule wherein all data items are equally spaced and such spacing, expressed in terms of data items, is an integer.

3. The method of claim 2, wherein scheduling to provide a feasible schedule further comprises the step of scheduling the data items such that indexing information can be compactly stored and broadcasted.

4. The method of claim 3, wherein the step of assigning indices further comprises assigning indices such that leaf nodes within a subtree are partitioned into intervals.

5. The method of claim 4, wherein the step of indexing further comprises partitioning the indices into intervals, wherein the indexing information contained in a node comprises the first and last indices of each interval in a subtree of the node.

6. The method of claim 5, wherein the step of partitioning further comprises partitioning the indices within each subtree into a minimum number of intervals wherein no two intervals in a subtree can be combined to form a larger interval.

7. The method of claim 2, wherein the step of scheduling items to provide a feasible schedule further comprises the steps of:

determining values of optimal distances between data items; and shifting said values to a closest power of 2 that is bigger than or equal to said values.

8. The method of claim 2, wherein the step of scheduling items to provide a feasible schedule further comprises the steps of:

determining values of optimal distances between data items;

partitioning the values into intervals bounded by consecutive integer powers of 2, so that each interval is bounded by a lower power and a higher power of 2;

shifting the values within an interval upwardly to the higher power of 2 if said values are greater than $2/3$ of said higher power of 2 of the interval, and shifting the values within the interval alternately downwardly to the lower power of 2 and upwardly to the higher power of 2 if said values are less than or equal to $2/3$ of said higher power of 2 of the interval.

9. The method of claim 1, wherein the step of indexing further comprises storing, in a first internal node, a pointer to a second internal node that is the first node to be traversed outside of a subtree of the first internal node, wherein the pointer provides a time offset indicating how long from a present time said second internal node will be broadcast.

10. An indexed data broadcast system, comprising:

a server for broadcasting data items and indexing information over a communications channel according to a broadcast schedule;

a scheduling device for scheduling the broadcast of the data items and indexing information, said scheduling device comprising a q-ary indexing tree, said indexing tree having:

a plurality of internal nodes in which the indexing information is stored; and a plurality of leaf nodes in which the data items are stored; wherein, the indexing information stored at each internal node identifies each data item stored in the leaf nodes of a subtree rooted at each of such nodes.

11. The indexed data broadcast system of claim 10, and further wherein a first internal node includes a pointer to a second internal node that is the first node to be visited, according to the broadcast schedule, outside of a subtree of the first internal node, wherein the pointer provides a time offset indicating how long from a present time said second internal node will be broadcast.

12. The indexed data broadcast system of claim 10, wherein the indexing information comprises ranges of indices, wherein the indices identify each data item.

13. The indexed data broadcast system of claim 12, wherein the indexing information comprises a first index and a last index that bound each of the ranges of indices in a subtree of an internal node.

* * * * *